United States Patent
Jackson

(10) Patent No.: US 10,583,603 B2
(45) Date of Patent: Mar. 10, 2020

(54) APPARATUS AND METHOD FOR STRETCHING AND TAKING-AWAY POLYMER FILMS

(71) Applicant: 3M INNOVATIVE PROPERTIES COMPANY, St. Paul, MN (US)

(72) Inventor: Jeffery N. Jackson, Madison, AL (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 310 days.

(21) Appl. No.: 15/538,775

(22) PCT Filed: Dec. 16, 2015

(86) PCT No.: PCT/US2015/066103
§ 371 (c)(1),
(2) Date: Jun. 22, 2017

(87) PCT Pub. No.: WO2016/106046
PCT Pub. Date: Jun. 30, 2016

(65) Prior Publication Data
US 2017/0361520 A1    Dec. 21, 2017

Related U.S. Application Data

(60) Provisional application No. 62/095,461, filed on Dec. 22, 2014.

(51) Int. Cl.
*B29C 55/08*    (2006.01)
*B29C 55/20*    (2006.01)
(Continued)

(52) U.S. Cl.
CPC .............. *B29C 55/08* (2013.01); *B29C 31/00* (2013.01); *B29C 55/20* (2013.01); *B29C 69/001* (2013.01);
(Continued)

(58) Field of Classification Search
CPC ......... B29C 55/20; B29C 55/08; B29C 31/00; B29C 69/00; B29C 69/001;
(Continued)

(56) References Cited

U.S. PATENT DOCUMENTS 3,240,412 A    3/1966 Zygan
4,643,297 A    2/1987 Krieger
(Continued)

FOREIGN PATENT DOCUMENTS

CN    101486252    7/2009
DE    102012025487    6/2014
(Continued)

OTHER PUBLICATIONS

International Search Report for PCT International Application No. PCT/US2015/066103, dated Feb. 22, 2016, 5pgs.

*Primary Examiner* — William P Fletcher, III
(74) *Attorney, Agent, or Firm* — Robert H. Jordan; Gregory D. Allen; Eloise J. Maki

(57) ABSTRACT

A film (50) processing apparatus (20) including a film stretching device (22) and a take-away device (24) and a film processing method using the apparatus. The take-away device receives the film after the stretching device and transports the film along a conveying region in a direction of transport (X). The take-away device includes opposing, first and second conveyor assemblies. The first conveyor assembly has a continuous belt driving a plurality of discrete pads (180*a*, 180*b*). Each pad forms a contact face (194*a*, 194*b*) extending between leading (200*b*) and trailing edges (202*a*). The pads are configured and arranged such that the trailing edge (202*a*) of a first pad (180*a*) overlaps the leading edge (200*b*) of an immediately adjacent second pad (180*b*) as the first and second pads traverse the conveying region. The overlap is characterized by a line (322) perpendicular to the direction of transport passing at any given moment through
(Continued)

the first and second pads. A shape of the contact face can define a major central axis that is non-perpendicular and non-parallel with the direction of transport.

25 Claims, 12 Drawing Sheets

(51) Int. Cl.

| | | |
|---|---|---|
| B65G 15/14 | (2006.01) | |
| B65G 17/06 | (2006.01) | |
| B65G 35/00 | (2006.01) | |
| B29C 31/00 | (2006.01) | |
| B29C 69/00 | (2006.01) | |
| B65G 15/46 | (2006.01) | |
| B65G 17/32 | (2006.01) | |
| B65G 17/38 | (2006.01) | |
| B65G 47/08 | (2006.01) | |
| B29L 11/00 | (2006.01) | |

(52) U.S. Cl.
CPC ............ *B65G 15/14* (2013.01); *B65G 15/46* (2013.01); *B65G 17/06* (2013.01); *B65G 17/065* (2013.01); *B65G 17/323* (2013.01); *B65G 17/326* (2013.01); *B65G 17/38* (2013.01); *B65G 35/00* (2013.01); *B65G 47/08* (2013.01); *B29C 2793/009* (2013.01); *B29K 2995/0051* (2013.01); *B29L 2011/00* (2013.01)

(58) Field of Classification Search
CPC .. B29C 2793/009; B65G 15/46; B65G 17/06; B65G 17/32; B65G 17/323; B65G 17/326; B65G 17/38; B65G 47/08; B29L 11/00; B29K 2995/0051
USPC ................ 425/66, DIG. 53; 264/288.4, 291, 264/DIG. 73
See application file for complete search history.

(56) References Cited

U.S. PATENT DOCUMENTS

| | | | |
|---|---|---|---|
| 4,893,709 A | | 1/1990 | Schroeder |
| 5,517,737 A | | 5/1996 | Viltro |
| 5,699,188 A | | 12/1997 | Gilbert |
| 5,797,172 A | | 8/1998 | Hosmer |
| 5,825,543 A | | 10/1998 | Ouderkirk |
| 5,862,574 A | | 1/1999 | Poterala |
| 5,882,574 A | | 3/1999 | Geisinger |
| 5,965,247 A | | 10/1999 | Jonza |
| 6,096,375 A | | 8/2000 | Ouderkirk |
| 6,916,440 B2 | * | 7/2005 | Jackson ................... B29C 55/08 264/288.4 |
| 6,936,209 B2 | | 8/2005 | Jackson |
| 6,939,499 B2 | | 9/2005 | Merrill |
| 7,153,122 B2 | | 12/2006 | Jackson |
| 7,153,123 B2 | | 12/2006 | Jackson |
| 7,229,271 B2 | | 6/2007 | Merrill |
| 7,740,470 B2 | | 6/2010 | Merrill |
| 7,749,411 B2 | | 7/2010 | Nagashima |
| 7,958,991 B2 | | 6/2011 | Magaldi |
| 9,561,616 B2 | | 2/2017 | Baumeister |
| 2002/0180107 A1 | * | 12/2002 | Jackson ................... B29C 55/08 264/288.4 |
| 2004/0099993 A1 | * | 5/2004 | Jackson ................... B29C 55/08 264/290.2 |
| 2011/0039084 A1 | | 2/2011 | Maki |
| 2012/0068376 A1 | | 3/2012 | Sano |

FOREIGN PATENT DOCUMENTS

| | | |
|---|---|---|
| EP | 1380622 | 1/2004 |
| FR | 2113892 | 6/1972 |
| JP | 09155951 | 6/1997 |
| JP | 10278108 | 10/1998 |
| JP | 2000198140 | 7/2000 |
| JP | 2003-026318 | 1/2003 |
| WO | WO 1995-17303 | 6/1995 |
| WO | WO 1996-10347 | 4/1996 |
| WO | WO 1999-36248 | 7/1999 |
| WO | WO 1999-36812 | 7/1999 |
| WO | WO 2004/050331 | 6/2004 |

* cited by examiner

APPARATUS AND METHOD FOR STRETCHING AND TAKING-AWAY POLYMER FILMS

CROSS REFERENCE TO RELATED APPLICATIONS

This application is a national stage filing under 35 U.S.C. 371 of PCT/US2015/066103, filed Dec. 16, 2015, which claims the benefit of Provisional Application No. 62/095,461, filed Dec. 22, 2014, the disclosure of which is incorporated by reference in its/their entirety herein.

BACKGROUND

The present invention relates to systems and methods for stretching polymer films. More particularly, it relates to in-line devices provided with the stretching system for handling or taking-away film following a stretching operation.

There are a variety of reasons to stretch polymer films. Stretching can enhance or generate desired mechanical, optical, and other film properties. For example, polymer films can be stretched to provide a desired degree of uniaxial or near uniaxial orientation to provide useful optical properties. In general, perfect uniaxial orientation of a birefringent polymer results in a film (or layers of a film) in which the index of refraction in two of three orthogonal directions is the same (for example, the width and thickness of a film). The index of refraction in the third direction (for example, along the length (L) direction of the film) is different from the indices of refraction in the other two directions. Typically, perfect uniaxial orientation is not required and some degree of deviation from the optimal conditions can be allowed depending on a variety of factors including the end-use application of the polymer film.

Regardless of whether uniaxial orientation in the stretched film is achieved or desired, systems for stretching the film in at least one direction typically includes a stretching station or device, and one or more stations or devices downstream of the stretching device that handle and optionally further process the stretched film. The film stretching device can assume various forms. Some conventional film stretching devices are, or are akin to, a tenter, and generally entail gripping opposing edges of the film with tenter clips (or other gripping device). The tenter clips are connected to tenter chains that ride along diverging tracks or rails. This arrangement propels the film forward in a machine direction of film travel and stretches the film in a transverse direction. Conventional tenter-type film stretching devices may not achieve uniaxial stretch. Other film stretching devices have been developed, described for example in U.S. Pat. Nos. 6,916,440; 6,936,209; and 6,939,499 that beneficially achieve uniaxial or substantially uniaxial stretch.

While extensive efforts have been made to develop optimized film stretching devices, the film handling stations or devices downstream of the film stretching device have generally remained unchanged. The downstream station is oftentimes referred to as a "take-away" device or station, and transports film received from the stretching device. The take-away device includes a conveyor-type system for transporting the film, conventionally provided as one or more gripping mechanisms carried by a chain or belt. The gripping mechanisms interface with opposing surfaces of the film, normally at or near the film's edges. The gripping mechanisms can include tenter clips carried by an endless belt and arranged to grip an edge of the film. Other gripping formats include opposing conveyors arranged to interface with (e.g., grip) the opposing major surfaces of the film. The set of opposing conveyors are normally located to contact the film at or near an edge of the film, and can include a series of discrete pads carried by an endless chain (e.g., each pad is attached to an individual link of the chain). The pads each provide a contact face formed of a material selected to minimize damage to the film and enhance gripping of the film. With movement of the chain, then, the pads of the opposing conveyors are sequentially brought into contact with, and thus transport, the film. Due to the viscoelastic property of many films subject to stretching, it is not necessary to have a continuously gripped interface with the film along the take-away device, such that the intermittent interface provided by the discrete pad tracks is highly viable. While the pliant or soft contact face of each pad may not impart overt defects into the film, for many end-use applications, an even minor alteration of the film is unacceptable and oftentimes the region of the film at which interface with the pads occurs must be discarded. In recognition of this process restriction, manufacturers endeavor to minimize the extent to which any defect imparted by the pads propagates across a width of the film by, for example, selecting a soft or pliant material. When handling highly thin films (e.g., on the order of 17 microns or less), however, the likelihood of imparting unacceptably large or problematic imperfections increases substantially regardless of the material utilized for the pad contact face, especially at locations between neighboring pads.

In light of the above, a need exists for film stretching apparatuses having a take-away device configured to interface or grip film in a manner that induces minimal defects.

SUMMARY

Some aspects of the present invention are directed toward an apparatus for processing film. The apparatus includes a stretching device and a take-away device. The stretching device is adapted to stretch a received film. The take-away device receives the film after the stretching device. The take-away device establishes an entrance side, an exit side, and a conveying region interfacing with and transporting the film in a direction of transport from the entrance side to the exit side. The take-away device includes a track comprising opposing, first and second conveyor assemblies arranged to contact opposing surfaces of the film, respectively, along the conveying region. The first conveyor assembly includes a continuous belt driven along a path of travel, and a plurality of discrete pads carried by the belt. Each of the pads forms a contact face opposite the belt for contacting the film along the conveying region. The contact face extends between opposing, leading and trailing edges. The leading edge is arranged downstream of the trailing edge relative to the path of travel. The plurality of pads includes a first pad immediately adjacent a second pad. The first and second pads are configured and arranged such that the trailing edge of the first pad overlaps the leading edge of the second pad as the first and second pads are traversed along the conveying region. In some embodiments, the overlap is characterized by a line perpendicular to the direction of transport passing through the first and second pads. In other embodiments, a shape of the contact face of the first and second pads defines a major central axis that is non-perpendicular and non-parallel with the direction of transport. In other embodiments, the continuous belt is a chain comprising a plurality of interconnected chain links, and respective ones of the pads are attached to individual ones of the chain links.

Other aspects of the present invention are directed toward a method of processing film. The method includes conveying and stretching film in a stretching device. The film is transported in a direction of transport downstream of the stretching device with a take-away device. The take-away device includes a track comprising opposing, first and second conveyor assemblies. The first conveyor assembly includes a plurality of discrete pads carried by a continuous belt. The plurality of pads includes first and second pads immediately adjacent one another and each defining a contact face having a leading edge and a trailing edge. In this regard, the step of transporting the film includes the first and second conveyor assemblies engaging opposing surfaces, respectively of the film, with the first and second pads being brought into sequential contact with the film. With this sequential contact, the film is periodically in simultaneous contact with both of the first and second pads along a grip line that is perpendicular to the direction of transport.

DETAILED DESCRIPTION OF ILLUSTRATIVE EMBODIMENTS

Figure 1:
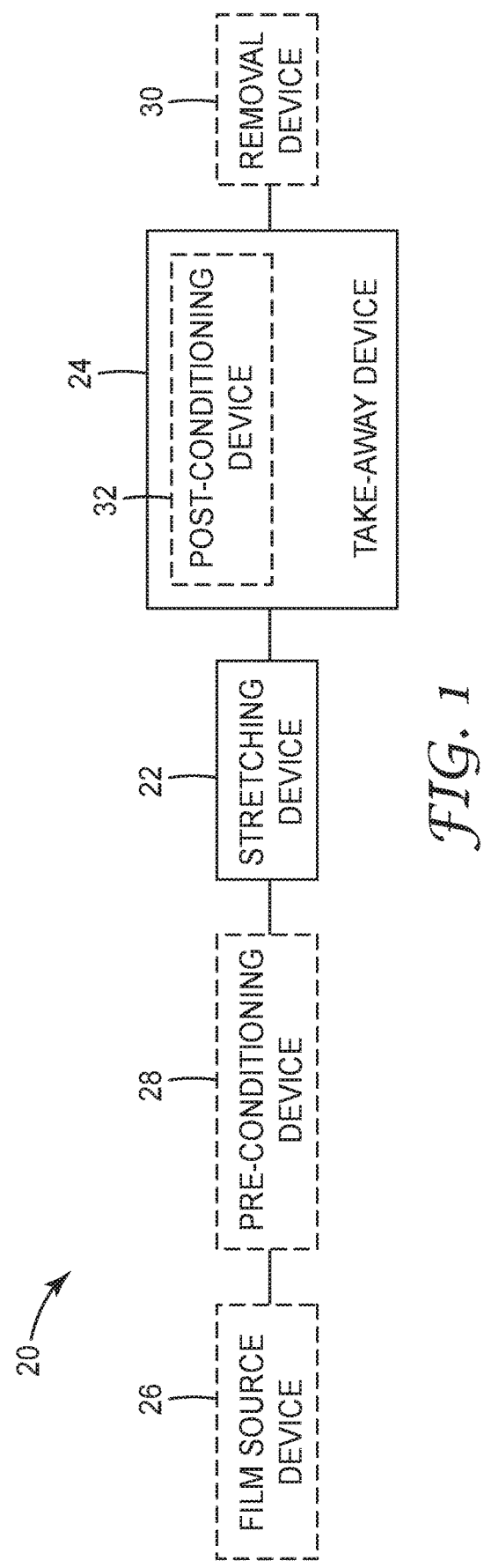
FIG. 1 is a block diagram of a film processing system in accordance with principles of the present invention.

One embodiment of an apparatus or system 20 for processing film in accordance with principles of the present invention is shown in block form in FIG. 1. The apparatus 20 includes a stretching device or station 22 and a take-away device or station 24. In general terms, the stretching device 22 operates to transport and stretch a continuous length of film; the take-away device 24 is located downstream of the stretching device 22 and operates to transport and remove the stretched film from the stretching device 22. As made clear below, aspects of the present invention relate to handling features provided with the take-away device 24. Other components of the apparatus 20, including other components of the take-away device 24 apart from the handling features described below, can assume a wide variety of forms. Further, the apparatus 20 can include one more additional, optional devices or stations, such as a film source device or station 26, a pre-conditioning device or station 28 and/or a removal device or station 30. One or more of the film processing attributes embodied by the optional source device 26 and/or the optional pre-conditioning device 28 as described below can be incorporated into the stretching device 22; similarly, one or more of the film processing attributes embodied by an optional post-conditioning device 32 as described below can be incorporated into the take-away device 24. Regardless, aspects of the present invention are applicable generally to a number of different films, materials, and processes.

Figure 2:
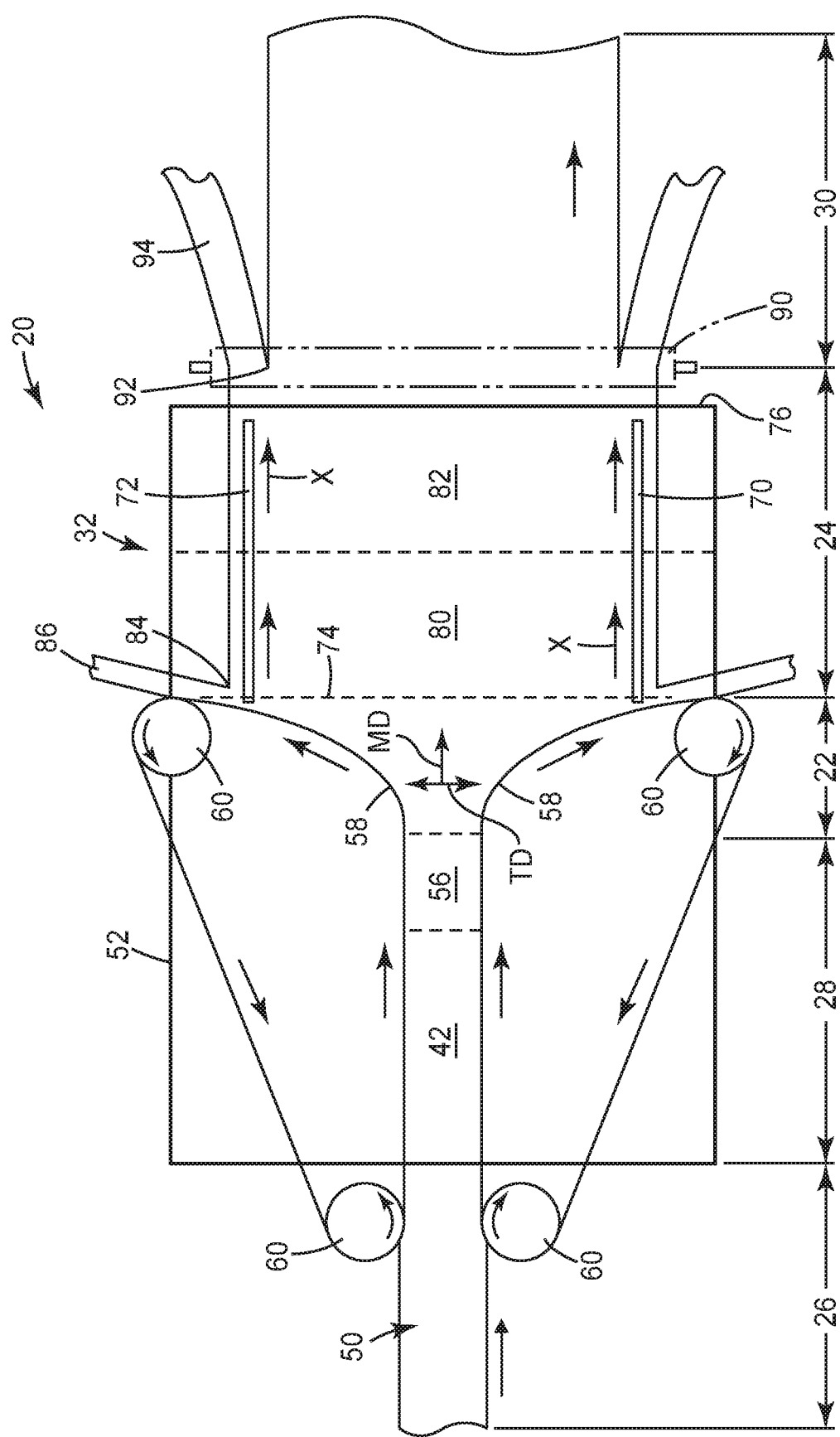
FIG. 2 is a schematic illustration of portions of one embodiment of a film processing system in accordance with principles of the present invention.

By way of reference, FIG. 2 illustrates one non-limiting example of the processing apparatus 20 in greater detail, processing a film 50, and provides context for the handling features of the take-away device 24 of the present invention. The film 50 is initially provided to the apparatus 20 at the optional source device 26 in a manner known in the art (e.g., produced or provided in a roll, a film extruder, etc.). The film 50 may then be processed by the optional pre-conditioning device 28 (that may alternatively be considered part of the stretching device 22), such as via an oven 52 or other device. The pre-conditioning device or step 28 may include a preheating zone (see region 54 of the film 50) and a heat soak zone (see region 56).

The film 50 is then stretched at the stretching device 22. The stretching device 22 includes tracks or other mechanisms for transporting edges of the film 50 along a path 58. For example, the edges of the film 50 may be grasped by mechanical clips or other gripping means that are moved by rollers 60 in the direction of the arrows. In some embodiments, the path 58 is parabolic or substantially parabolic. Alternatively, the stretching device 22 can assume other forms and/or effectuate other film stretching techniques that may or may not incorporate a parabolic or substantially parabolic path. Regardless, a machine direction MD is established in the film 50. A transverse direction TD orthogonal to the machine direction MD an in a plane of the film 50 can also be designated, with the film 50 optionally being stretched in the transverse direction TD.

The take-away device 24 receives the film 50 downstream of the stretching device 22 as shown. In general terms, the take-away device 24 includes or establishes two or more tracks 70, 72, independent or apart from the transporting mechanisms of the stretching device 22, that operate to grip and traverse the film 50 in a direction of transport X (represented by arrows in FIG. 2) as described below. The direction of transport X is generally in the downstream direction relative to the stretching device 22 and can be in-line with the machine direction MD. The tracks 70, 72 operate to transport the film 50 from an upstream or entrance side 74 of the take-away device 24 to a downstream or exit side 76. The take-away device 24 can optionally subject the film 50 to further processing, such as by incorporating the post-conditioning device 32. In other embodiments, the take-away device 24 (and in particular the handling features provided by the tracks 70, 72 as described below) can be downstream of the post-conditioning device 32. Alternatively, the post-conditioning device 32 can be omitted. Where provided, the post-conditioning device 32 can include a first region 80 in which the film 50 may be set, and a second region 82 in which the film 50 may be quenched. A cut or splice may be made at 84, and flash or unusable portion 86 may be discarded. In some embodiments, quenching is performed outside of the stretching device 22. Typically, the film 50 is set when at least one component of the film 50 (e.g., one layer type in a multilayer film) reaches a temperature below the glass transition. The film 50 is quenched when all components reach a temperature level below their glass transition. Release of the selvages 86 from a continuous gripping mechanism can be done continuously; however, release from discrete gripping mechanisms, such as tenter clips, should be done so that all the material under any given clip is released at once.

The optional removal device 30 receives the film 50 downstream of the take-away device 24, and generally prepares the film 50 for later use. For example, the film 50 is typically wound on rolls for later use. Alternatively, direct converting may take place after take-away. In some embodiments, features of the removal device 30 can be considered part of the take-away device 24. Optionally a roller 90 may be used to advance the film 50, but this may be eliminated. Preferably, the roller 90 is not used as it would contact the stretched film 50 with the attendant potential damage to the stretched film 50. Another cut 92 may be made and unused portion 94 may be discarded.

Figure 3:
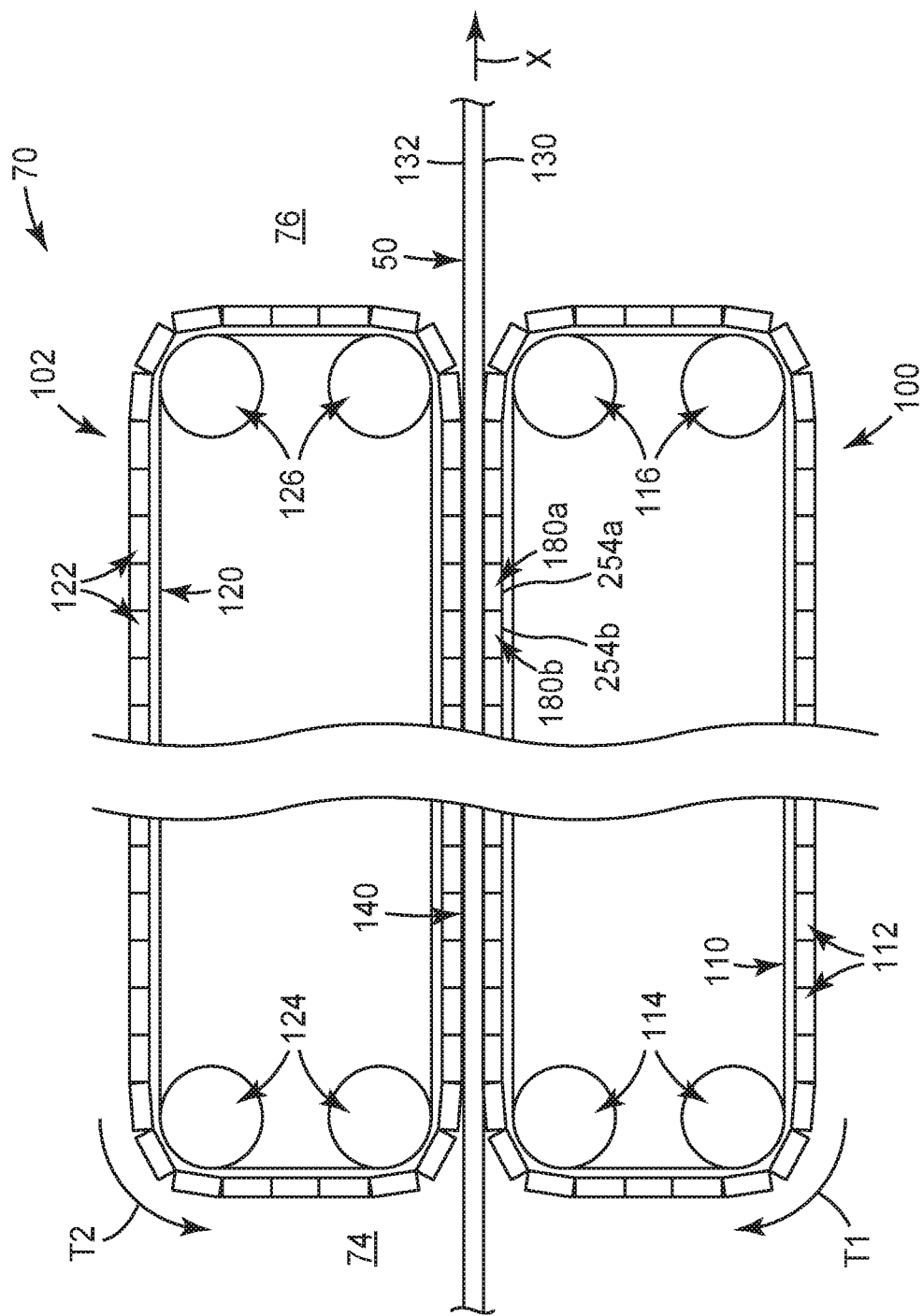
FIG. 3 is a simplified side view of a track useful with a take-away device of the systems of FIGS. 1 and 2.

With the above background in mind, one of the tracks 70 provided with the take-away station 24 is shown in FIG. 3, along with the film 50 (a thickness of which is exaggerated in the view for ease of understanding). The track 70 includes opposing, first and second conveyor assemblies 100, 102. In general terms, the first conveyor assembly 100 includes a continuous belt 110 and a plurality of pads 112. The plurality of pads 112 are carried by the belt 110, and the belt 110 is driven to traverse the pads 112 along a path of travel T1 as defined, for example, by opposing guides (e.g., pulleys, sprockets, gears, etc.) 114, 116. The second conveyor assembly 102 also includes a continuous belt 120 and a plurality of pads 122. The pads 122 are carried by the belt 120, and the belt 120 is driven to traverse the pads 122 along a path of travel T2 as defined, for example, by opposing guides (e.g., pulleys, sprockets, gears, etc.) 124, 126. The conveyor assemblies 100, 102 may or may not be identical. Regardless, the conveyor assemblies 100, 102 are arranged to interface with (e.g., grip) opposing major surfaces 130, 132 of the film 50 at a conveying region 140 (referenced generally). In particular, as the belt 110 of the first conveyor assembly 100 is driven along the path of travel T1, successive ones of the corresponding pads 112 contact the first major surface 130 along the conveying region 140; similarly, as the belt 120 of the second conveyor assembly 102 is driven along the path of travel T2, successive ones of the corresponding pads 122 contact the second major surface 132 along the conveying region 150. When operated in tandem, then, the conveyor assemblies 100, 102 transport the film 50 in the direction of transport D from the entrance side 74 to the exit side 76 of the take-away device 24 (FIG. 2).

Figure 4A:
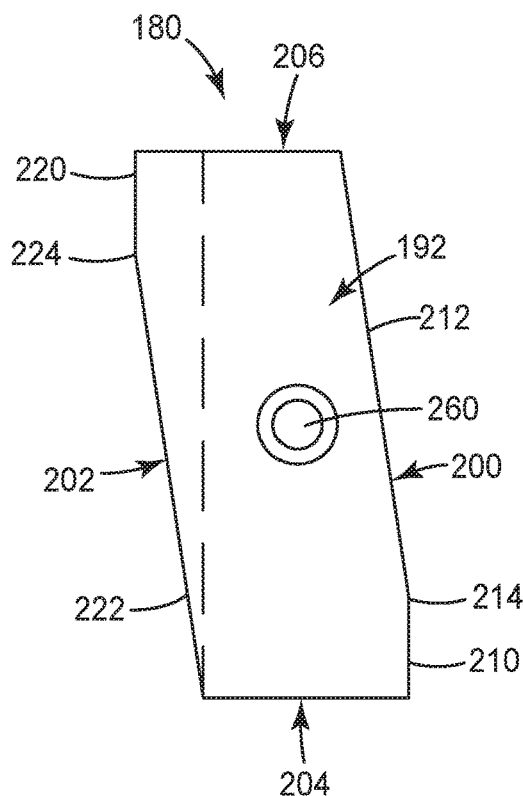
FIG. 4A is a top plan view of a pad in accordance with principles of the present invention and useful with the track of FIG. 3.

The conveyor assemblies 100, 102 may or may not be identical. Further, the pads 112, 122 provided with the corresponding conveyor assembly 100, 102 may or may not be identical. In some embodiments, however, at least two of the pads 112 of the first conveyor assembly 100 or at least two of the pads 122 of the second conveyor assembly 102 are configured to establish, when arranged immediately adjacent one another, an overlapping relationship along at least a portion of the conveying region 140. For example, one embodiment of a pad (or "angled pad") 180 in accordance with principles of the present invention and useful with one or both of the conveyor assemblies 100, 102 is shown in FIGS. 4A-4E. As a point of reference, the illustration of FIG. 4A is identical to that of FIG. 4B except that various element numbering is omitted from the view of FIG. 4A for ease of understanding. The pad 180 includes a base 190 and a contact member 192. The base 190 is configured to facilitate mounting to the corresponding belt 112, 122 (FIG. 6) and to support the contact member 192. The contact member 192 establishes a contact face 194 configured to interface with, contact, or grip a film.

In some embodiments, the base 190 and the contact member 192 are discretely formed of differing materials and subsequently assembled. For example, the base 190 can be a relatively hard material, such as a metal or metal alloy (e.g., aluminum), whereas the contact member 192 is a relatively deformable or resilient material (e.g., silicone rubber) well-suited for non-damaging contact with a thin film. Other materials are also envisioned, and in yet other embodiments, the pad 180 is a homogenous, integral body formed of a single material or composition (e.g., the pad 180 is an integral block of metal, polymer, etc.). Regardless, the pad 180 establishes the contact face 194 to have geometry features conducive to the overlapping relationships mentioned above.

Figure 4B:
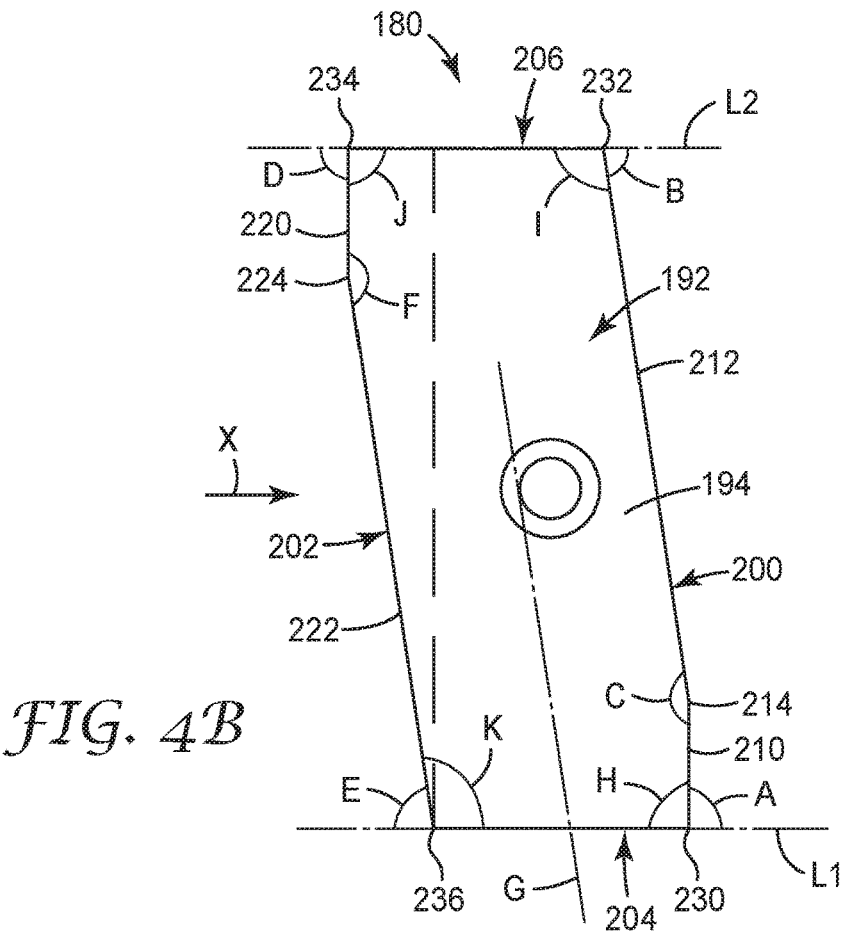
FIG. 4B is the top plan view of FIG. 4A with additional element numbers.

For example, the contact face 194 forms or defines a first or leading edge 200 and an opposing second or trailing edge 202. As a point of reference, the terms "leading" and "trailing" are in reference to a spatial orientation of the contact face 194 as the pad 180 is traversed along the conveying region 140 (FIG. 3) in the direction of transport X (identified in FIGS. 4B and 4C) relative to the film 50 (FIG. 3). More particularly, as the contact face 194 enters the conveying region 140, the contact face 194 initially contacts or grips the film 50 at the leading edge 200 as described in greater detail below. The leading and trailing edges 200, 202 each extend between opposing, first and second side edges 204, 206. At least a portion of the leading edge 200 in extension between the first and second side edges 204, 206 defines a line or plane that is non-perpendicular to and non-parallel with the direction of transport X. At least a portion of the trailing edge 202 in extension between the first and second side edges 204, 206 defines a line or plane that is non-perpendicular to and non-parallel with the direction of transport X. With these optional embodiments, while the shape or arrangement of the leading edge 200 relative to the first and second side edges 204, 206 can correlate with that of the trailing edge 202, the leading and trailing edges 200, 202 are reverse mirror images of one another (e.g., a shape of the contact face 194 in the top plan view of FIGS. 4A and 4B is non-symmetrical).

In some embodiments, extension of the leading edge 200 between the first and second side edges 204, 206 includes or defines a first segment 210 and a second segment 212. The first segment 210 intersects with and extends from the first side edge 204. The second segment 212 intersects with and extends from the second side edge 206. In some embodiments, the first and second segments 210, 212 are linear in extension (at least in the top plan view of FIGS. 4A and 4B), and intersect at a transition point 214. At least the second segment 212 is arranged to define an angular relationship (e.g., non-perpendicular and non-parallel) with the direction of transport X. For example, a plane or line established by extension of the first segment 210 forms an angle A with a line L1 parallel to the direction of transport X and passing through the point of intersection of the leading edge 200 and the first side edge 204. The angle A approximates a right angle in some embodiments (e.g., 89° to 91°). Conversely, a plane or line established by extension of the second segment 212 forms an angle B with a line L2 parallel to the direction of transport X and passing through the point of intersection of the leading edge 200 and the second side edge 206. The angle B is acute in some embodiments, for example on the order of 70° to 89°. In some embodiments, majority of a length of the leading edge 200 is defined by the second segment 212 (e.g., a linear length of the second segment 212 (e.g., linear distance between the second side edge 206 and the transition point 214) is greater than a linear length of the first segment 210). While the leading edge 200 can include or define one or more additional linear segments between the first and second segments 210, 212, with embodiments in which the first and second segments 210, 212 intersect at the transition point 214, an angle C is formed by the first and second segments 210, 212, and can be less than 180° (e.g., on the order of 160°) to 179°. Relative to the direction of transport X, then, the first segment 210 is "ahead" or in front of the second segment 212.

Extension of the trailing edge 202 between the first and second side edges 204, 206 can correspond with that of the leading edge 200, but in a reverse manner. For example, extension of the trailing edge 202 can include first and second segments 220, 222. The first segment 220 intersects and extends from the second side edge 206. The second segment 222 intersects with and extends from the first side edge 204. In some embodiments, the first and second segments 220, 222 are linear in extension (at least in the top plan view of FIGS. 4A and 4B), and intersect at a transition point 224. At least the second segment 222 is arranged to define an angular relationship with the direction of transport X. For example, the first segment 220 forms an angle D with the line L2 (that otherwise passes through the point of intersection of the trailing edge 202 and the second side edge 206). The angle D can approximate a right angle, and can be identical to the angle A formed by the first segment 210 of the leading edge 200 relative to the first side edge 204. The second segment 222 forms an angle E with the line L1 (that otherwise passes through the point of intersection of the trailing edge 202 and the first side edge 204). The angle E is acute, and can be identical to the angle B formed by the second segment 212 of the leading edge 200 relative to the second side edge 206. An angle F can be formed by the first and second segment 220, 222 that can be identical to the angle C of the leading edge 200. Relative to the direction of transport X, then, the first segment 220 is "behind" the second segment 222. A linear length of the first segments 210, 220 can be substantially identical (e.g., within 5% of a truly identical relationship); similarly, a linear length of the second segments 212, 222 can be substantially identical (e.g., within 5% of a truly identical relationship). In some embodiments, the second segments 212, 222 are substantially parallel (e.g., within 2° of a truly parallel relationship) and combine to define a major axis G of a shape of the contact face 194. The major axis G is arranged at a non-parallel and non-perpendicular angle relative to the direction of transport X.

A shape or geometry of the leading and trailing edges 200, 202 can alternatively be described with reference to the first and second side edges 204, 206. For example, in some embodiments, the first and second side edges 204, 206 are substantially linear (e.g., within 2° of a truly linear arrangement) in extension between the leading and trailing edges 200, 202, and can be substantially parallel (e.g., within 2° of truly parallel relationship) with the direction of transport X. A first corner 230 defining a first angle H is formed at an intersection of the leading edge 200 and the first side edge 204, a second corner 232 defining a second angle I is formed at an intersection of the leading edge 200 and the second side edge 206, a third corner 234 defining a third angle J is formed at an intersection of the trailing edge 202 and the second side edge 206, and a fourth corner 236 is defining a fourth angle K is formed at an intersection of the trailing edge 202 and the first side edge 204. With these designations in mind, with embodiments in which the first and second side edges 204, 206 are substantially linear and substantially parallel (e.g., within 2° of a truly parallel relationship), the first and third angles H, J can be substantially identical (e.g., within 2° of a truly identical relationship) and can approximate a right angle (e.g., 89° to 91°). Further, the second and fourth angles I, K can be substantially identical (e.g., within 2° of a truly identical relationship) and are obtuse angles, for example on the order of 91° to 110°.

While the leading edge 200 has been described as including or defining the discernable first and second segments 210, 212 (and the trailing edge 202 as including or defining the discernable first and second segments 220, 222), in other embodiments, a more singular geometry or angle of extension can be provided (e.g., an entirety of the leading edge 200 and an entirety of the trailing edge 202 forms a non-perpendicular and non-parallel angle relative to the direction of transport X). Alternatively, other angular geometries can be incorporated into the leading and trailing edges 200, 202. In more general terms, geometries of the contact face 194 are such that at least a section or segment of the leading edge 200 is arranged at a non-parallel and non-perpendicular angle relative to the direction of transport X, as is at least a section or segment of the trailing edge 202.

Figure 4C:
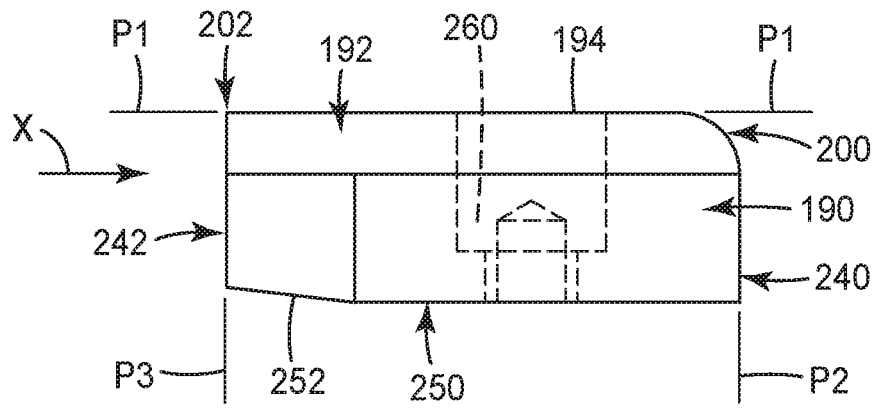
FIG. 4C is a side view of the pad of FIG. 4A.
Figure 4D:
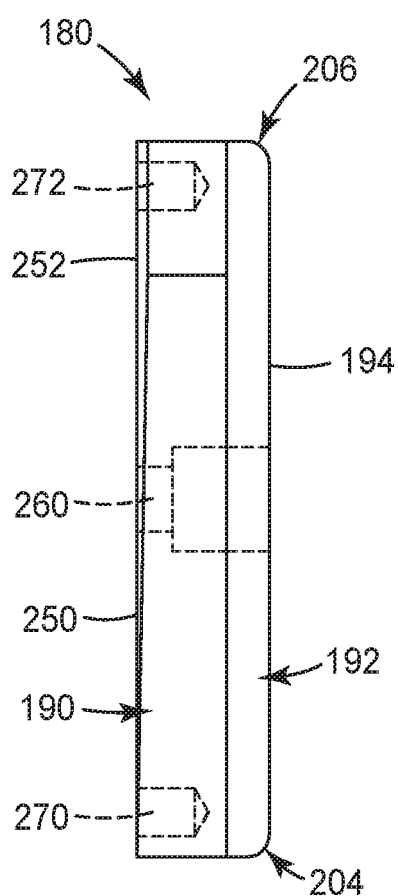
FIG. 4D is a rear end view of the pad of FIG. 4A.
Figure 4E:
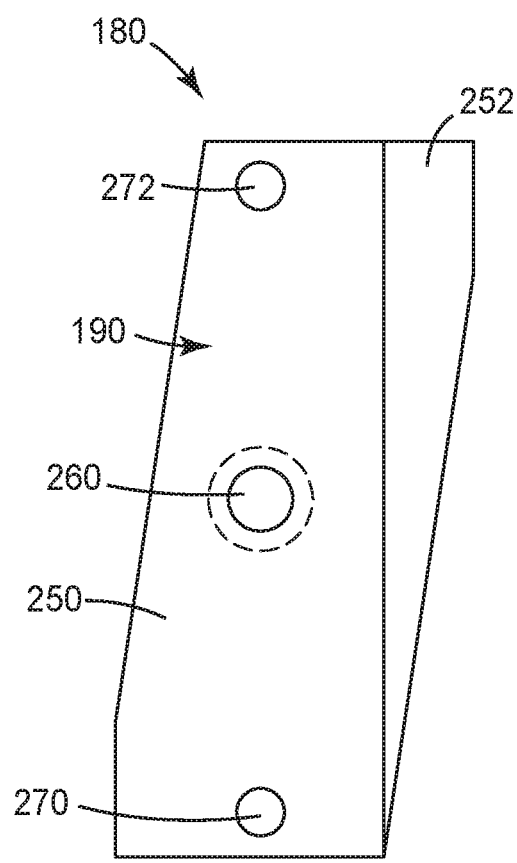
FIG. 4E is a bottom plan view of the pad of FIG. 4A.

As best reflected by the side view of FIG. 4C, the pad 180 can form the leading edge 200 along at least the first segment 210 as a curved corner. For example, the contact face 194 can be viewed as defining a major plane P1. The leading edge 200 can be defined as an extension between the major plane P1 and a major plane P2 established by a leading face 240 of the pad 180. With these conventions in mind, FIG. 4C reflects a curvature along the leading edge 200 (e.g., in a cross-sectional plane parallel to the direction of travel X, the leading edge 200 at the first segment 210 (best seen in FIGS. 4A and 4B) is or forms a curved corner). In contrast, a right angle corner can be defined by the trailing edge 202 between the contact face major plane P1 and a major plane P3 established by a trailing face 242 of the pad 180. The optional curved shape or curved corner format of the leading edge 200 minimizes potential damage to a film (not shown) as the leading edge 200 is initially brought into contact with the film. Other constructions of the leading edge 200 that may or may not include a curved format are also acceptable.

A perimeter shape of the base 190 mimics a shape or footprint of the contact face 194 as described above in some embodiments. The base 190 forms or defines an engagement face 250 opposite the contact face 194 that is generally configured for abutting interface with a corresponding surface or component of the corresponding belt 112, 122 (FIG. 3). The engagement face 250 optionally tapers in extension toward the trailing face 242, forming an undercut region 252. As described in greater detail below, the undercut region 252 promotes articulation of the corresponding conveyor assembly 100, 102 upon final assembly and during use. Alternatively, the undercut region 252 can be omitted.

Figure 5:
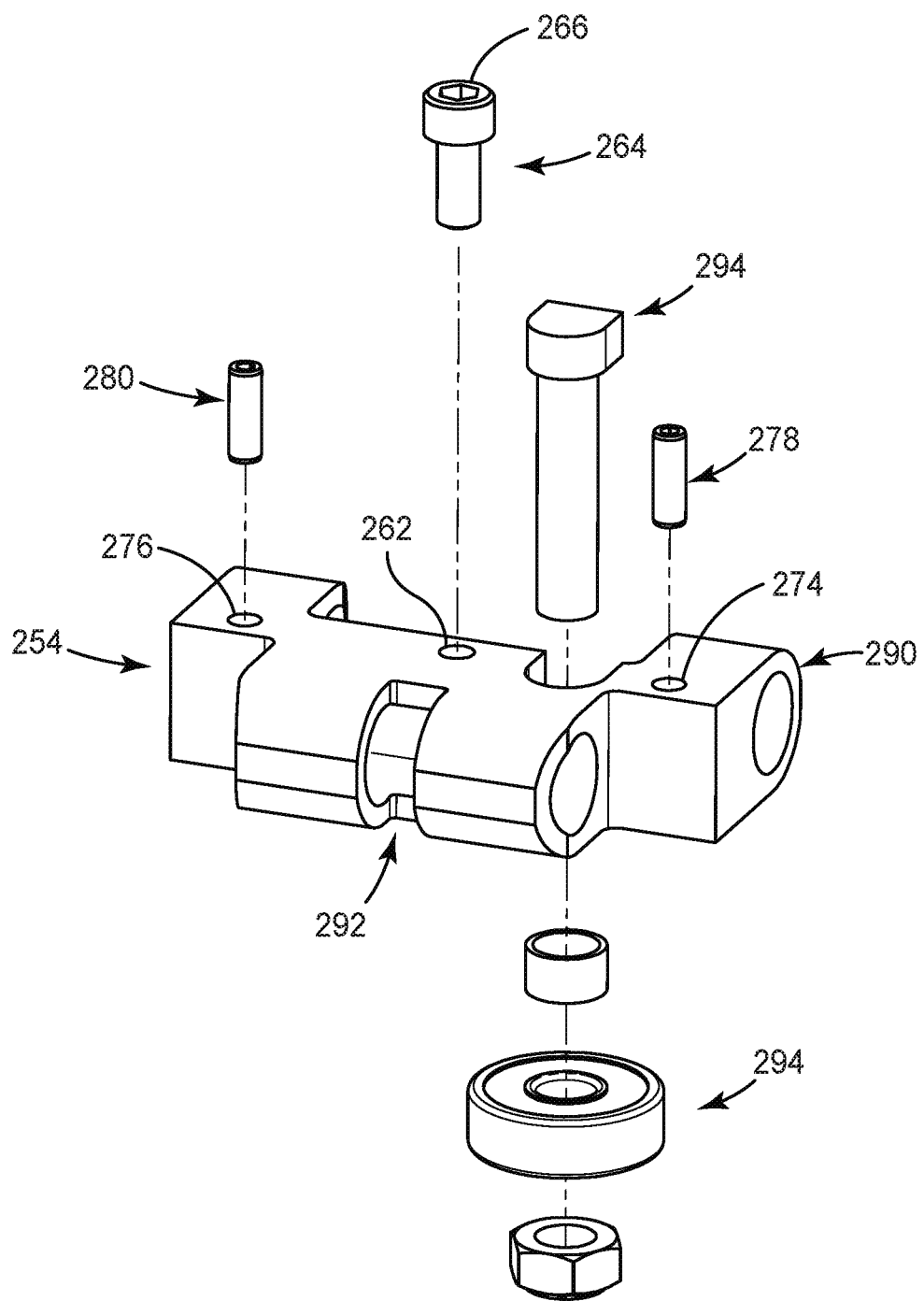
FIG. 5 is a perspective view of a chain link useful with a continuous belt component of the track of FIG. 3, along with mounting components useful for mounting the pad of FIG. 4A.

The base 190 further incorporates features that promote attachment to the corresponding belt 112, 122 (FIG. 3). In this regard, in some embodiments the pad 180 is adapted for use with a chain-type belt (e.g., a block chain or a roller chain), with the pad 180 being mounted to, and carried by, a single link of the chain. Mounting of the pad 180 to the chain link can assume a wide variety of forms, with the pad 180 and the chain link incorporating complimentary mounting features. For example, one non-limiting example of a chain link 254 useful with the take-away devices of the present invention and to which the pad 180 (FIGS. 4A-4E) can be formatted for mounting is shown in FIG. 5, along with various mounting members described below. With cross-reference between FIGS. 4A-5, the base 190 can define or contain a central bore 260 corresponding with a central bore 262 in the chain link 254. As shown, a fastener 264 (e.g., a bolt) attaches the pad 180 to the chain link 254 via the central bores 260, 262. In some embodiments, the central bore 260 can be open to the contact face 194, and can include a counterbore sized to receive a head 266 of the fastener 264 such that up final assembly, the fastener 264 is flush with, or is below, the contact face 194. Further, the central bore 260 can be longitudinally off-set between the leading and trailing edges 200, 202. Guide holes 270, 272 are also defined in the base 190, corresponding with guide holes 274, 276 in the chain link 254. The guide hole pairs 270, 274 and 272, 276 are each sized to receive a corresponding location pin 278, 280; upon final assembly, the location pins 278, 280 serve to limit pivoting movement of the pad 180 relative to the chain link 254. It will be understood that the mounting constructions reflected by FIGS. 4A-5 are but one acceptable example, and the chain link 254 can assume a wide variety of other forms (with the pad 180 incorporating alternative mounting features commensurate with a design of the chain link or other continuous belt component). As a point of reference, however, the exemplary chain link 254 further includes or forms complimentary leading and trailing link regions 290, 292 each configured for linked connection to a separate, identically formed chain link (e.g., the leading and trailing link regions 290, 292 each form a transverse passage sized to receive a linking pin (not shown); the leading link region 290 of a first chain link 254 is pivotally connected to the trailing link region 292 of a second chain link 254 by a linking pin passing through the corresponding transverse passages). Further, a guide assembly 294 (referenced generally) can be connected to the chain link 254 for purposes of effectuating control over a spatial location of the chain link 254 in some embodiments.

Figure 6:
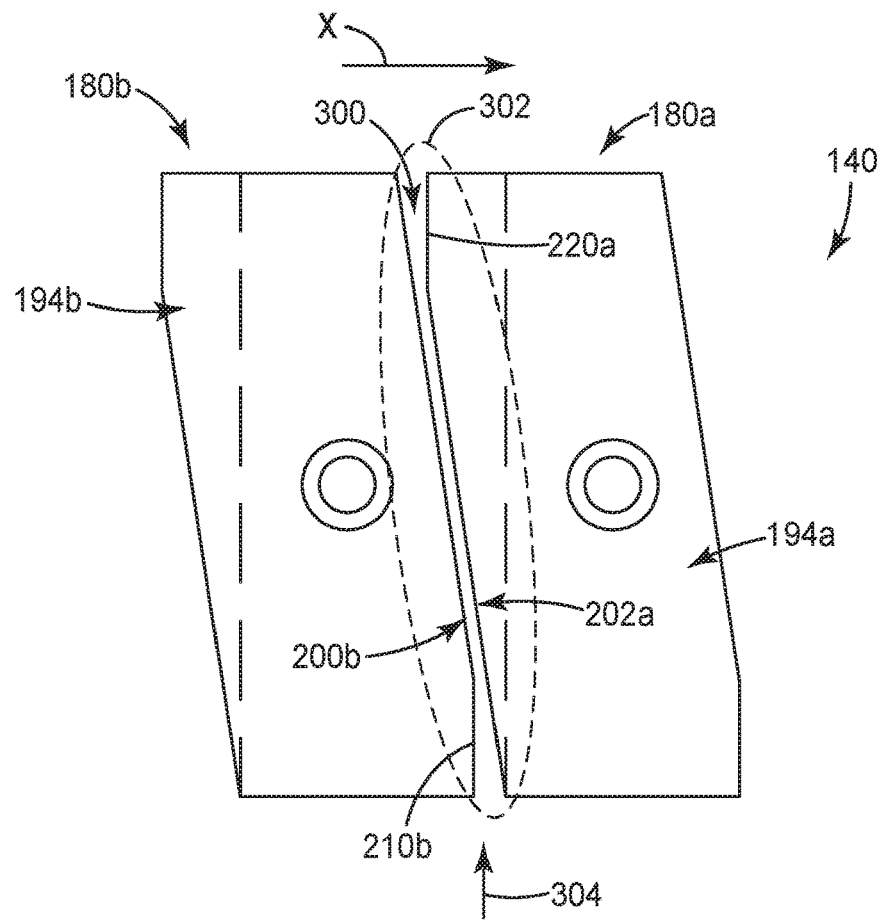
FIG. 6 is a top plan view of two of the pads of FIG. 4A in a co-planar arrangement and having an overlapping relationship in accordance with principles of the present invention.

Returning to FIG. 3, the plurality of pads 112 of the first conveyor assembly 100 is identified as having two the above-described angled pads 180a, 180b. It will be recalled that in some embodiments, all the pads 112 can have an identical construction; in other embodiments, only some of the plurality of pads 112 are an angled pad, while others have a more conventional design. Regardless of the how the angled pads 180a, 180b are mounted to the corresponding individual chain link 254a, 254b (not specifically shown in the simplified illustration of FIG. 3, but referenced generally) or other endless belt component, upon final assembly the first and second angled pads 180a, 180b are immediately adjacent one another. Relative to the path of travel T1 (and the direction of transport X), the first pad 180a is downstream or "ahead" of the second pad 180b. As the belt 110 is driven along the path of travel T1, an overlap between the first and second pads 180a, 180b is established along at least a portion of the conveying region 140. For example, FIG. 6 represents an arrangement of the first and second pads 180a, 180b as they are driven in the direction of transport X along the conveying region 140 (referenced generally). As a point of reference, the contact faces 194a, 194b are substantially co-planar (e.g., within 5° of a truly co-planar relationship) when traversing at least a majority of the conveying region 140, with the overlapping arrangement of the immediately adjacent pads 180a, 180b being identifiable in the substantially co-planar state. The trailing edge 202a of the first (or "leading") pad 180a is immediately adjacent the leading edge 200b of the second (or "trailing") pad 180b. In some embodiments, the pads 180a, 180b are constructed and arranged such that the pads 180a, 180b do not physically contact one another (e.g., a gap 300 is generated between the first pad trailing edge 202a and the second pad leading edge 200b). However, a region of overlap 302 is created whereby at least one theoretical line 304 perpendicular to the direction of transport X intersects both of the pads 180a, 180b.

Figure 7A:
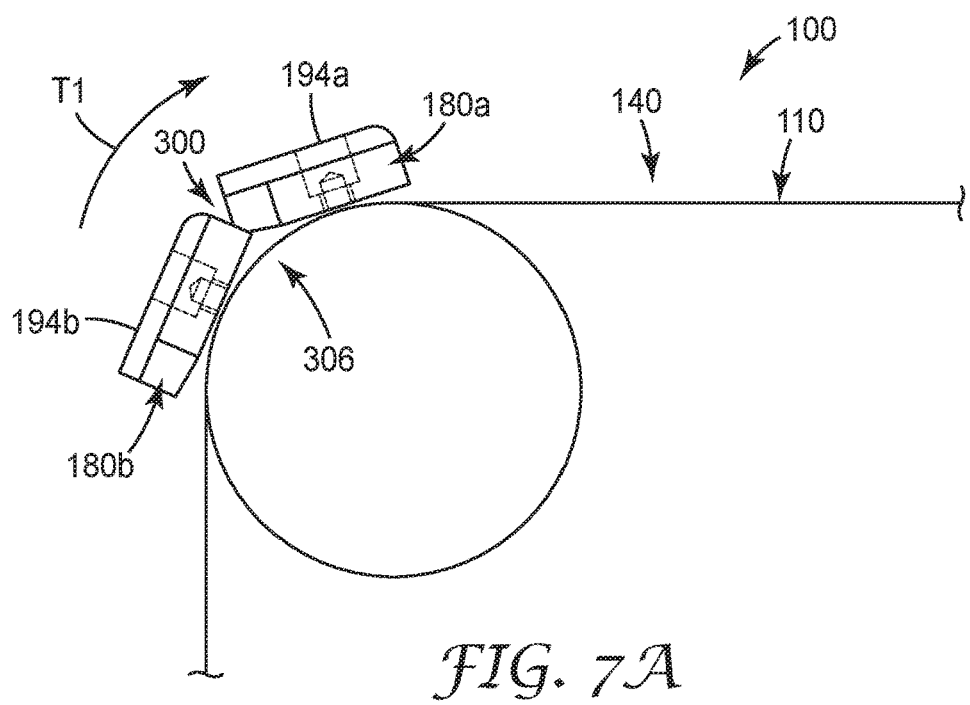
FIG. 7A is a simplified side view of a portion of the track of FIG. 3 and illustrating a relationship between two immediately adjacent pads at a first location along a path of travel.
Figure 7B:
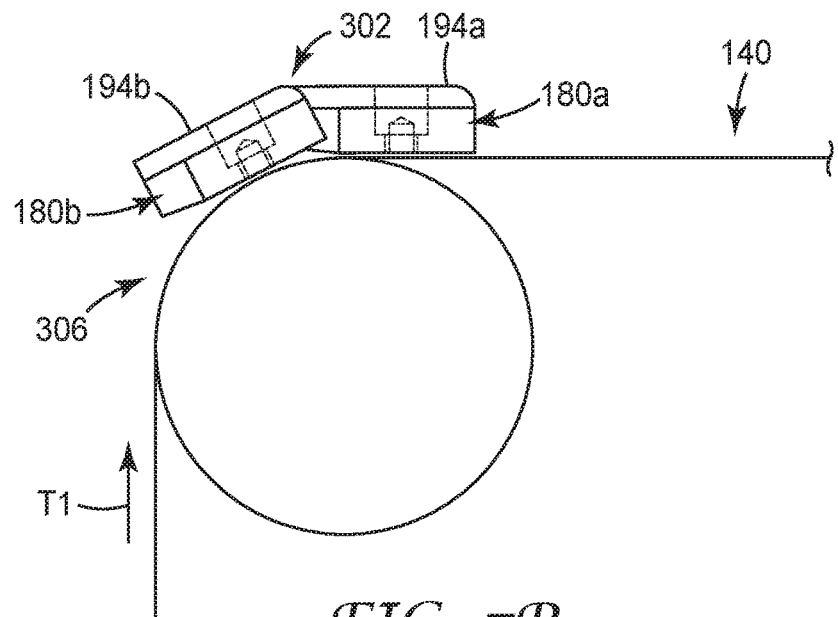
FIG. 7B is a simplified side view of the portion of FIG. 7A and illustrating a relationship between the two adjacent pads at a second location along the path of travel.
Figure 7C:
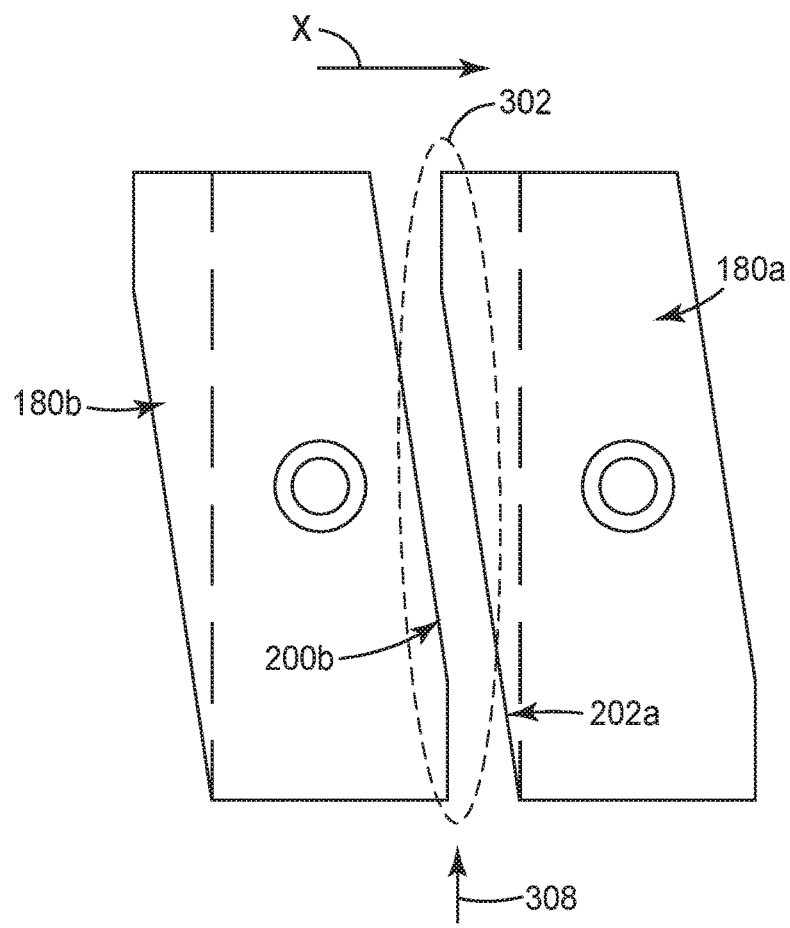
FIG. 7C is a simplified top plan view of the arrangement of FIG. 7B.

The region of overlap 302 can also be established when the contact faces 194a, 194b are not substantially co-planar. As a point of reference, and as reflected by the partial illustration of the conveyor assembly 100 in FIG. 7A (in which only the first and second angled pads 180a, 180b are shown as being carried by the belt 110), the path of travel T1 includes the conveying region 140 as described above, as well as a wrap region 306 immediately upstream of the conveying region 140 (relative to a direction of the path of travel T1). As described above, when the pads 180a, 180b simultaneously traverse the conveying region 140, the corresponding contact faces 194a, 194b will be substantially co-planar in some embodiments. As the pads 180a, 180b simultaneously traverse the wrap region 306, however, the contact faces 194a, 194b are not substantially co-planar as shown. The gap 300 between the contact faces 194a, 194b along the wrap region 306 is more pronounced (as compared to a size of the gap 300 along the conveying region 140 in which the contact faces 194a, 194b are substantially co-planar), and a region of overlap between the pads 180a, 180b may not exist. As the pads 180a, 180b are driven along the path of travel T1 from the wrap region 306 to the conveying region 140, a relationship between the contact faces 194a, 194b begins to approach the substantially co-planar spatial arrangement as reflected by FIG. 7B. The contact faces 194a, 194b at the stage of FIG. 7B are not substantially co-planar, but the region of overlap 302 (referenced generally) exists. More particularly, FIG. 7C represents a top view of the arrangement of FIG. 7B and the region of overlap 302 is again identified; at least one theoretical line 308 perpendicular to the direction of transport X intersects both of the pads 180a, 180b. Stated otherwise, relative to direction of transport X, at least a portion of the first pad trailing edge 202a is "behind" (or upstream of) at least a portion of the second pad leading edge 200b as the second pad 180b "enters" the conveying region 140.

Figure 8:
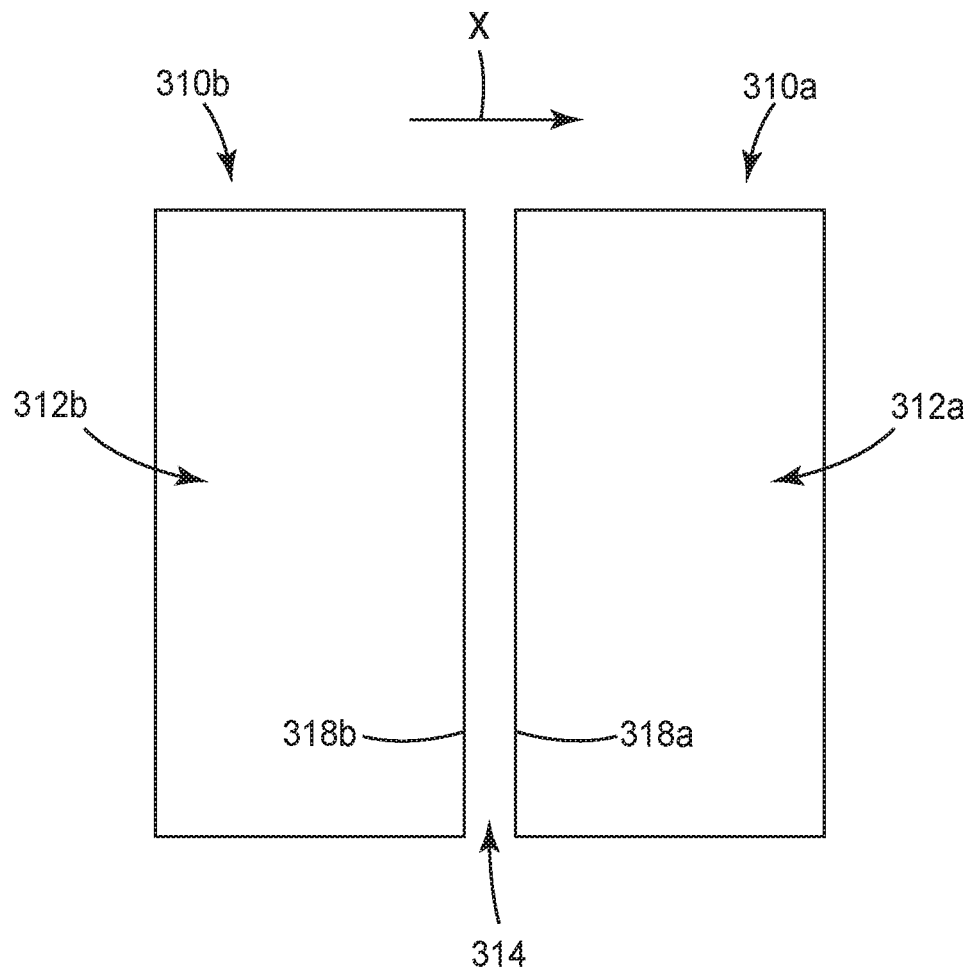
FIG. 8 is a simplified top plan view of two immediately adjacent pads of a conventional take-away device and in a co-planar arrangement.

By way of comparison, FIG. 8 illustrates a more conventional construction and arrangement of immediately adjacent first and second pads 310a, 310b of a take-away device of a film stretching apparatus as the pads 310a, 310b are simultaneously driven through a conveying region. The pads 310a, 310b both provide a film contact face 312a, 312b defining a rectangular perimeter shape, with a gap 314 being defined between a trailing edge 316a of the first pad 310a and a leading edge 318b of the second pad 310b (e.g., the gap 314 exists when the contact faces 312a, 312b are substantially co-planar such as when traversing the conveying region of the take-away device). With this conventional construction, no overlap is generated between the first and second pads 310a, 310b in that no theoretical line perpendicular to the direction of transport X can be drawn that intersects both of the pads 310a, 310b even when the contact faces 312a, 312b are substantially co-planar. The absence of overlap (and the complete spacing between the pads 310a, 310b) is even more pronounced when the contact faces 312a, 312b are not substantially co-planar, such as a point in time when the second pad 310b is transitioning from the wrap region to the conveying region (as described above with respect to FIGS. 7B and 7C).

Figure 9A:
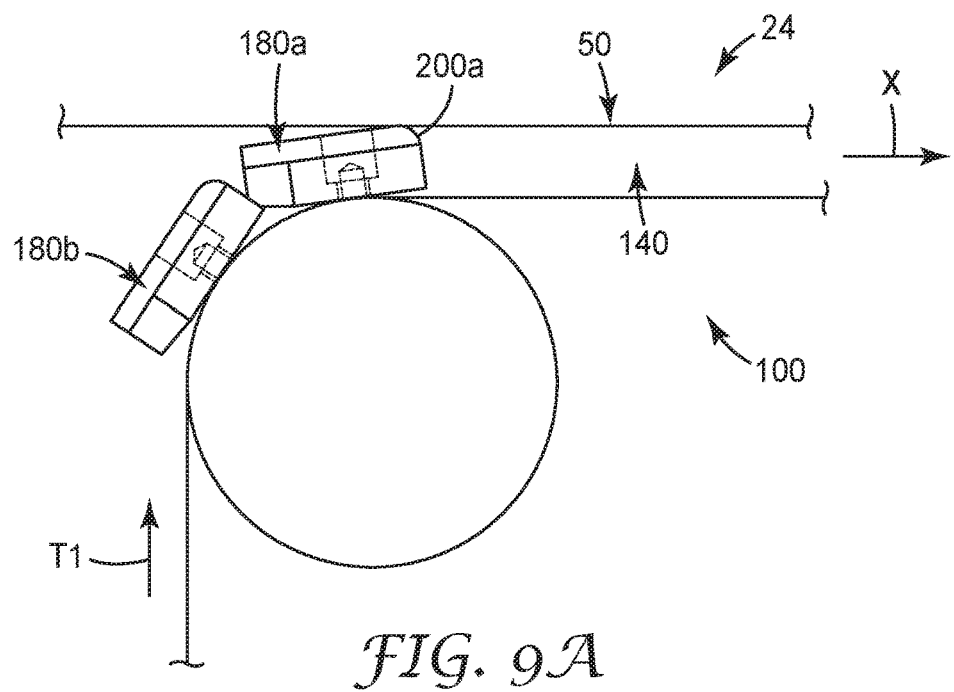
FIGS. 9A-9D illustrate progressive gripped interface with a film with the track of FIG. 3 employing two of the pads of FIG. 4A.
Figure 9B:
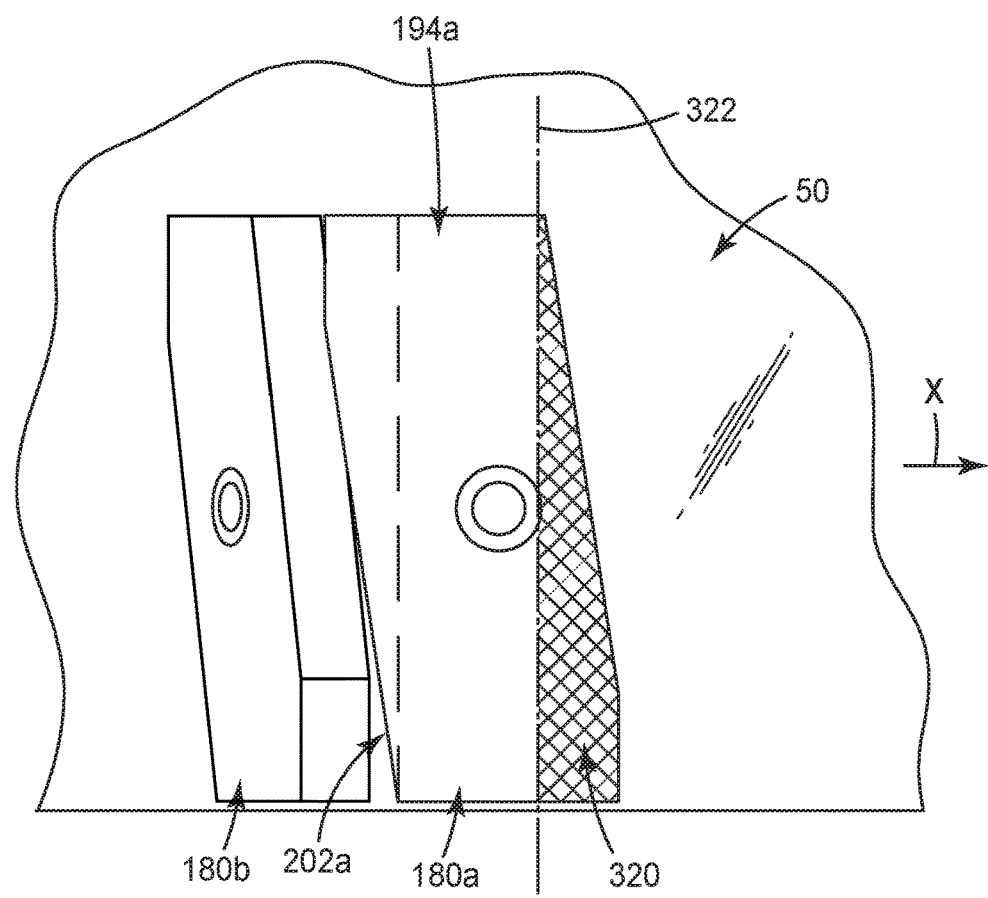

The overlapping pad constructions of the present invention promote a more continuous gripped interface with the film being conveyed. For example, the simplified, partial illustration of FIG. 9A represents a first point in time of operation of the take-away device 24 in transporting the film 50, including an operational state of the first conveyor device 100 in which the first pad 180a is in partial contact with the film 50 at the conveying region 140 and the second pad 180b is "upstream" of the conveying region 140 and not in contact with the film 50. The first pad 180a is spatially arranged such that the leading edge 200a bears against the film 50, with the optionally curved corner of the leading edge 200a present a non-damaging or gentle initial gripping interface. FIG. 9B is a simplified top view representation of FIG. 9A, with an area of contact 320 between the film 50 and the conveyor assembly 100 (at the first pad 180a) shown by cross-hatching. At the point in time of FIGS. 9A and 9B, the area of contact 320 includes a portion of the contact face 194a of the first pad 180a and initiates at a grip line 322 (e.g., the isolating takeaway point of first effective gripper contact). In some embodiments, the grip line 322 is substantially perpendicular (e.g., within 5° of a truly perpendicular relationship) to the direction of transport X. The film 50 is not in contact with the contact face 194b of the second pad 180b.

Figure 9C:
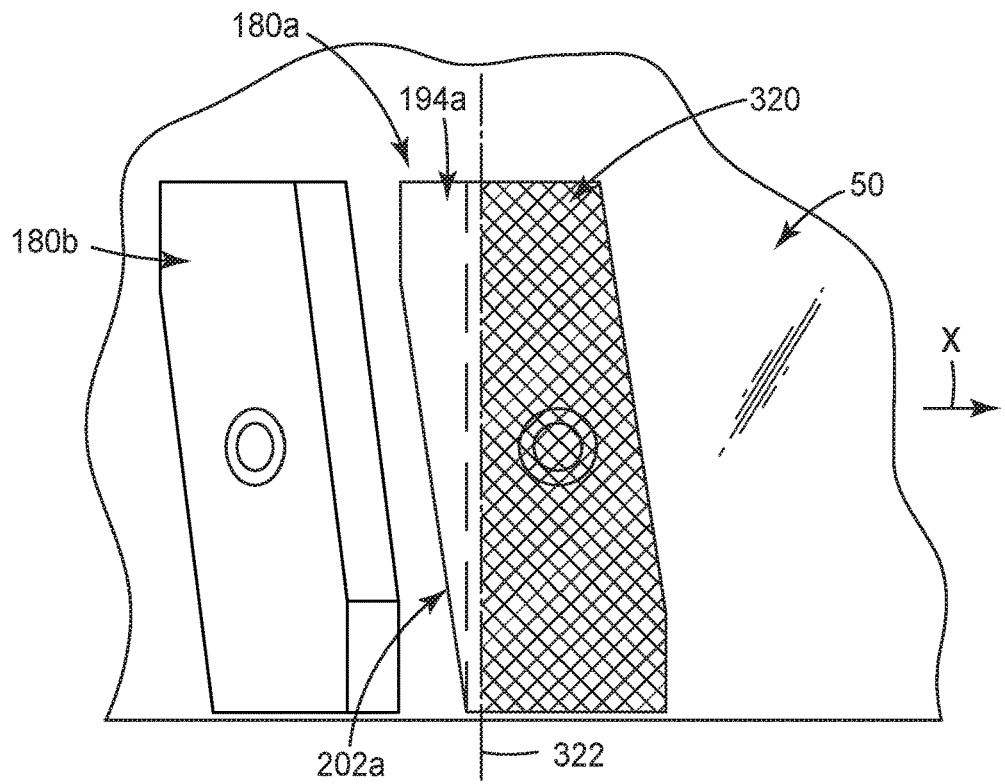

FIG. 9C is a simplified top view representation of an incrementally-later point in time in which the pads 180a, 180b have further progressed along the path of travel T1 (FIG. 3) and in the direction of transport X. While the film 50 is still not yet in contact with the second pad 180b, the area of contact 320 at the contact face 194a of the first pad 180a has progressed in a direction of the trailing edge 202a (i.e., as compared to the arrangement of FIG. 9B, the grip line 322 is closer to the trailing edge 202a).

Figure 9D:
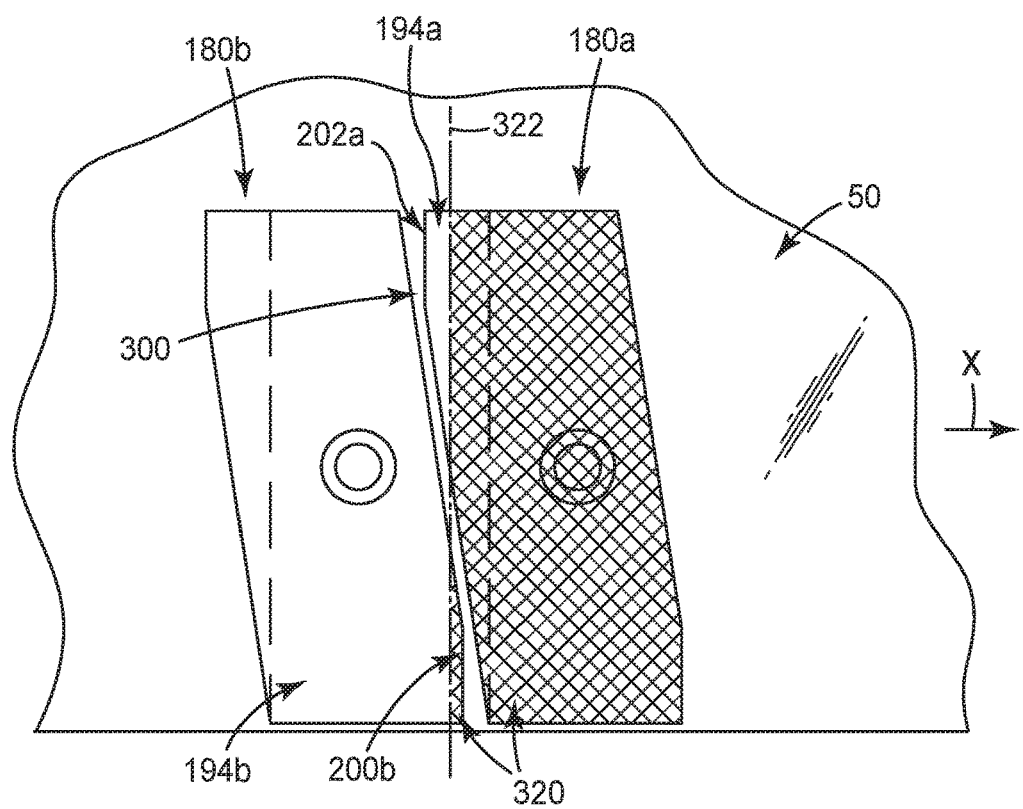

With further operation of the first conveyor assembly 100 (FIG. 3), contact between the film 50 and the second pad 180b is initiated. For example, FIG. 9D is a simplified top view representation of an incrementally-later point in time in which the pads 180a, 180b have further progressed along the path of travel T1 (FIG. 3) and in the direction of transport X as compared to FIG. 9C. As shown, the area of contact 320 now includes a portion of the contact face 194b of the second pad 180b. The grip line 322 extends along the contact face 194a, 194b of both the first and second pads 180a, 180b. That is to say, due to the angled shape of the first and second pads 180a, 180b relative to the direction of transport X (and thus relative to the grip line 322), the grip line 322 will be established along a portion of the second pad contact face 194b before "leaving" the first pad contact face 194a (i.e., the grip line 322 will not progress entirely upstream of the first pad trailing edge 202a before interfacing with or "crossing" the second pad leading edge 200b). Thus, a continuous interface with the grip line 322 is established from the first pad 180a to the second pad 180b as the first conveyor assembly 100 transports the film 50 along the direction of transport X. Alternatively stated, while the grip line 322 may cross over the gap 300, at least a portion of the grip line 322 is at all times supported by one or both of the contact faces 194a, 194b as the grip line 322 progresses from the first pad 180a to the second pad 180b. It has surprisingly been found that the overlapping pad constructions of the present invention minimize formation and/or propagation of imperfections in a film progressively gripped by the pads, for example highly thin films having a thickness on the order of 17 microns in some embodiments.

Figure 10:
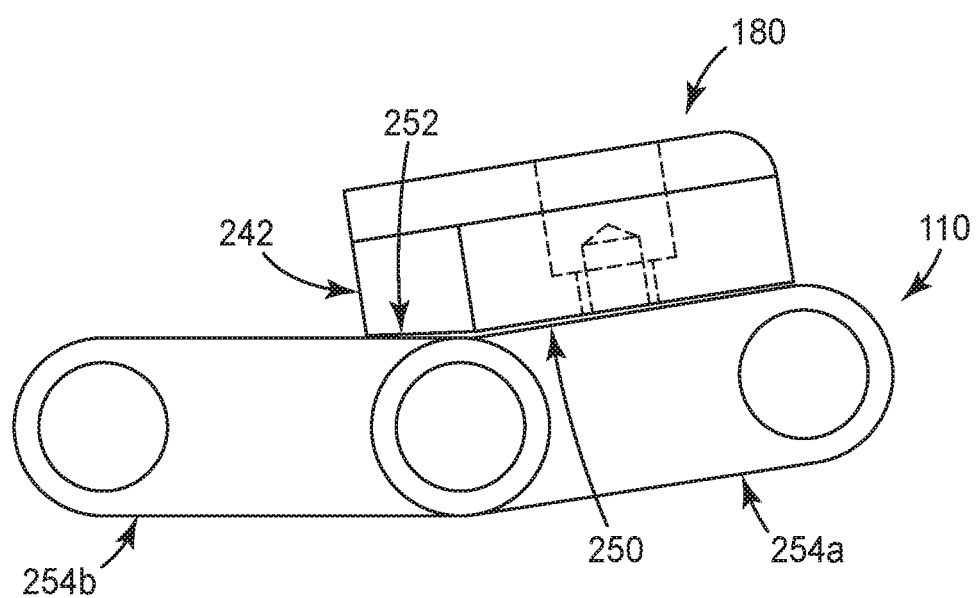
FIG. 10 is a simplified side view of a portion of a continuous belt and the pad of FIG. 4A.

Returning to FIG. 6, in some embodiments, the pads 180a, 180b are shaped and arranged such that a width of the gap 300 is non-uniform (including when the corresponding contact faces 194a, 194b are substantially co-planar as shown). For example, a linear width of the gap 300 is increased along the first segment 220a of the first pad trailing edge 202a, and along the first segment 210b of the second pad leading edge 200b. This optional construction promotes clearance between the pads 180a, 180b as the pads traverse regions of the path of travel T1 (FIG. 3) that might otherwise temporarily pivot the pads 180a, 180b relative to one another. In related embodiments and with additional reference to FIG. 10, the optional undercut region 252 facilitates inward articulation or flexing of the belt 110. For example, with embodiments in which the endless belt 110 is a chain and the pad 180 is mounted to a first chain link 254a, the chain 110 can be articulated or flexed such that the first chain link 254a pivots toward a second, immediately upstream chain link 254b (and/or vice-versa). With this motion, the trailing face 242 of the pad 180 is spatially translated toward the second chain link 254b, including a portion of the second chain link 254b now in contact with the engagement face 250 at the undercut region 252. Where provided, the tapering shape of the engagement face 250 along the undercut region 252 permits a more overt articulation of the two chain links 254a, 254b relative to one another (as compared to a construction in which the undercut region 252 were omitted).

Returning to FIG. 3, in some embodiments, all of the plurality of pads 112 provided with the first conveyor assembly 100 can have the construction described above with respect to the angled pad 180 (FIGS. 4A-4E). In other embodiments, less than all, but at least some, of the plurality of pads 112 of the first conveyor assembly 100 have the construction described above with respect to the angled pad 180. For example, some of the plurality of pads 112 can have a differing or more conventional shape and configuration. In related embodiments, some of the plurality of pads 112 can have a contact face that differs from the contact face 194 (FIGS. 4A-4E) described above in terms of one or more of size, shape, and material (e.g., not all of the plurality of pads 112 need include a flexible contact member). In some embodiments, for example, the first conveyor assembly 100 is part of an existing take-away device and includes conventional pads; two or more (but not necessarily all) of the conventional pads are replaced or retro-fitted with the angled pads 180 of the present invention. In some embodiments all of the plurality of pads 122 provided with the second conveyor assembly 102 can have the construction described above with respect to the angled pad 180. In other embodiments, less than all, but at least some of the plurality of pads 122 of the second conveyor assembly 102 have the construction described above with respect to the angled pad 180. In yet other embodiments, none of the plurality of pads 122 of the second conveyor assembly 102 has the construction described above with respect to the angled pad 180. For example, the second conveyor assembly 102 can have a conventional format in which no overlapping region is established between any immediately adjacent pair of the pads 122. Further, some or all of the pads 122 of the second conveyor assembly 102 can be entirely formed of a hard material (e.g., metal) and need not include a flexible contact member. Regardless, as located along the conveying region 140, individual ones of the pads 122 of the second conveyor assembly 102 need not be aligned with corresponding ones of the pads 112 of the first conveyor assembly 100.

With additional reference to FIG. 2, the second track 72 of the take-away device 24 can have any of the constructions described above with respect to the first track 70. For example, the second track 72 can include opposing conveyor assemblies, at least one of which includes at least two discrete contact pads carried by an endless belt (e.g., a chain) and each have the construction described above with respect to the angled pad 180 (FIGS. 4A-4E). While the first and second tracks 70, 72 of the take-away device 24 are shown as being parallel and fixed, other formats are also acceptable. For example, any of the take-away device track arrangements described in U.S. Pat. No. 6,936,209 can be incorporated with the take-away device of the present invention (e.g., the tracks 70, 72 can be arranged at a non-parallel angle relative to one another (and with respect to a centerline of the film 50), a spacing between the tracks 70, 72 can be adjustable, etc.).

With specific reference to FIGS. 1 and 2, the take-away device 24 constructions of the present invention, and in particular the film handling attributes provided with the take-away conveyor assembly film contact pads as described above, can be implemented with a number of different film stretching apparatuses. In some embodiments, aspects of the present invention are believed to be well suited to fabrication of polymeric optical films where the visco-elastic characteristics of materials used in the film are exploited to control the amount, if any, of molecular orientation induced in the materials when the film is drawn during processing. Consideration of the various properties of the materials used to produce optical films may be exploited to produce optical films exhibiting improved characteristics, such as in terms of optical performance, increased resistance to fracture or tear, enhanced dimensional stability, better processability, and the like. With this in mind, the stretching device 22 can be configured to effectuate a uniaxial or substantially uniaxial stretch in the film 50, as described, for example in U.S. Pat. Nos. 6,916,440; 6,936,209; and 6,939,499. In general terms and in some embodiments, the film 50 is stretched along a first in-plane axis of the film while allowing contraction of the film 50 in a second in-plane axis and in the thickness direction of the film 50, with the stretching achieved by grasping edge portions of the film 50 and moving the edge portions of the film 50 along predetermined paths which diverge to create substantially the same proportional dimensional changes in the second in-plane axis of the film 50 and in the thickness direction of the film 50. The predetermined paths can be shaped so as to create substantially the same proportional dimensional changes in the second in-plane axis of the film 50 and in the thickness direction of the film 50. In some embodiments, at one of the edge portions of the film 50 is moved along a predetermined path that is substantially parabolic. In other embodiments, the speed of the edge of the film 50 is controlled to create substantially the same proportional dimensional changes in the second in-plane axis of the film 50 and in the thickness direction of the film 50. In yet other embodiments, at least one of the edge portions of the film 50 is moved along a predetermined path at a substantially constant speed. In yet other embodiments, the stretching device 22 can assume other forms known to those of ordinary skill that may or may not be configured to effectuate a uniaxial or substantially uniaxial stretch.

Other optional attributes provided with the apparatuses of the present invention and described in one or more of U.S. Pat. Nos. 6,916,440; 6,936,209; and 6,939,499 can also be incorporated, such as devices or techniques for effectuating a slit in the film 50 at the optional removal device 30 and/or the optional post-conditioning device 32. The slitting can be mobile and re-positionable so that it can vary with the changes in take-away positions needed to accommodate variable final transverse direction draw ratio. A variety of slitting techniques may be used, including a heat razor, a hot wire, a laser, a focused beam of intense IR radiation or a focused jet of heated air. A variety of optical films may be stretched or drawn in accordance with aspects of the present invention. The films may comprise single or multi-layer films. Suitable films are disclosed, for example, in U.S. Pat. Nos. 5,699,188; 5,825,543; 5,882,574; 5,965,247; and 6,096,375; and PCT Publication Nos. WO 95/17303; WO 96/10347; WO 99/36812; and WO 99/36248.

Films made in accordance with principles of the present invention may be useful for a wide variety of products including polarizers, reflective polarizers, dichroic polarizers, aligned reflective/dichroic polarizers, absorbing polarizers, retarders (including z-axis retarders). The films may comprise the optical element itself or they can be used as a component in an optical element such as matched z-index polarizers used in beamsplitters for front and rear projection systems, or as a brightness enhancement film used in a display or microdisplay. It should be noted that the apparatuses of the present invention can be used with a length orienter to make a mirror from a multi-layer optical film.

The apparatus, systems, devices and methods of the present invention provide a marked improvement over previous designs. The angled and overlapping relationships associated with some or all of the film contact pads provided with a stretching apparatus take-away device approximate a continuous grip from discrete pads or segments. Continuous support of the film in the take-away device can be highly useful with many types of film stretching systems, including those operated to stretch thin films.

Although the present invention has been described with reference to preferred embodiments, workers skilled in the art will recognize that changes can be made in form and detail without departing from the spirit and scope of the present invention. The complete disclosure of all patents, patent documents, and publications cited herein are incorporated by reference.

What is claimed is:

1. An apparatus for processing a film, the apparatus comprising:
   a stretching device for stretching a received film; and
   a take-away device that receives the film after the stretching device, the take-away device establishing an entrance side, an exit side, and a conveying region interfacing with and transporting the film in a direction of transport from the entrance side to the exit side;
   wherein the take-away device includes a first track including opposing, first and second conveyor assemblies arranged to contact opposing surfaces of the film, respectively, along the conveying region, the first conveyor assembly including:
      a continuous belt driven along a path of travel,
      a plurality of discrete pads carried by the belt, each of the pads forming a contact face opposite the belt for contacting the film along the conveying region, the contact face extending between opposing, leading and trailing edges, the leading edge arranged downstream of the trailing edge relative to the path of travel,
wherein the plurality of pads includes a first a pad immediately adjacent a second pad;
and further wherein the first and second pads are configured and arranged such that the trailing edge of the first pad overlaps the leading edge of the second pad as the first and second pads are traversed along the conveying region.

2. The apparatus of claim 1, wherein the path of travel further includes a wrap region leading to the conveying region, and further wherein the first and second pads are configured and arranged such that the trailing edge of the first pad does not overlap the leading edge of the second pad as the first and second pads are traversed along at least a portion of the wrap region.

3. The apparatus of claim 1, wherein the trailing edge of the first pad overlaps the leading edge of the second pad as the first and second pads are traversed along at least the majority of the conveying region.

4. The apparatus of claim 1, wherein a major central axis defined by a shape of the contact face of each of the first and second pads is non-perpendicular and non-parallel to the direction of transport.

5. The apparatus of claim 1, wherein a plane defined by a majority of the leading edge of the first and second pads is non-perpendicular and non-parallel to the direction of transport.

6. The apparatus of claim 1, wherein the first and second pads are configured and arranged such that at an instantaneous location of the first and second pads along the conveying region, a line perpendicular to the direction of transport passes through the first and second pads.

7. The apparatus of claim 1, wherein the contact face of each of the first and second pads further defines opposing, first and second side edges, the leading and trailing edges extending between the corresponding first and second side edges.

8. The apparatus of claim 7, wherein with respect to the second pad:
a first corner is defined between the leading edge and the first side edge; and
a second corner is defined between the leading edge and the second side edge;
wherein an angle of the first corner differs from the angle of the second corner.

9. The apparatus of claim 8, wherein the angle of the first corner is greater than 90°.

10. The apparatus of claim 9, wherein the angle of the second corner is 90°.

11. The apparatus of claim 7, wherein with respect to the second pad the leading edge defines a first segment in extension from the first side edge and a second segment in extension from the second side edge, and further wherein an intersection of the first and second segments defines an angle of less than 180°.

12. The apparatus of claim 11, wherein a length of the first segment is greater than a length of the second segment.

13. The apparatus of claim 11, wherein with respect to the second pad:
a first corner is defined at an intersection of the leading edge and the first side edge;
a second corner is defined at an intersection of the trailing edge and the first side edge;
wherein an angle of the first corner differs from the angle of the second corner.

14. The apparatus of claim 13, wherein with respect to the second pad:
a third corner is defined at an intersection of the leading edge and the second side edge; and
a fourth corner is defined at an intersection of the trailing edge and the second side edge;
wherein an angle of the third corner approximates the angle of the first corner, and the angle of the fourth corner approximates the angle of the second corner.

15. The apparatus of claim 1, wherein the first and second pads each form the corresponding leading edge as a curve corner.

16. The apparatus of claim 1, wherein the continuous belt is a chain comprising a plurality of interconnected links, and further wherein respective ones of the plurality of pads are attached to individual ones of the plurality of links.

17. The apparatus of claim 16, wherein a line of attachment between the first pad and the corresponding link is off-set between the corresponding leading and trailing edges.

18. The apparatus of claim 1, wherein the plurality of pads further includes a third pad, and further wherein a shape of the third pad differs from a shape of the first and second pads.

19. The apparatus of claim 1, wherein each of the plurality of pads has an identical shape.

20. The apparatus of claim 1, wherein the first conveyor assembly is located below the second conveyor assembly.

21. The apparatus of claim 20, wherein the second conveyor assembly includes:
a continuous belt;
a plurality of discrete pads carried by the belt and each forming a contact face for contacting the film along the conveying region;
wherein the contact face of at least one of the pads of the second conveyor assembly defines a shape identical to the contact face of the first pad.

22. The apparatus of claim 20, wherein the second conveyor assembly includes:
a continuous belt;
a plurality of discrete pads carried by the belt and each forming a contact face for contacting the film along the conveying region;
wherein the contact face of each of the pads of the second conveyor assembly has a shape differing from a shape of the first pad.

23. The apparatus of claim 1, wherein the take-away device further includes a second track including opposing, first and second conveyor assemblies arranged to contact the opposing surfaces of the film, respectively, along the conveying region, the second track being spaced from the first track, and further wherein the first conveyor assembly of the second track includes:
a continuous belt driven along a path of travel;
a plurality of discrete pads carried by the belt and including first and second pads identical to the first and second pads of the first track.

24. The apparatus of claim 1, wherein the stretching device is configured to convey the film in a machine direction, and further wherein the direction of transport of the take-away device is in-line with the machine direction.

25. A method of processing a film, the method comprising:
conveying a film within a stretching device;
stretching the film within the stretching device; and transporting the film in a direction of transport downstream of the stretching device with a take-away device, the take-away device including a first track with opposing, first and second conveyor assemblies, the first conveyor assembly including a plurality of discrete pads carried by a continuous belt, the plurality of pads including first and second pads immediately adjacent one another and each defining a contact face having a leading edge and a trailing edge;

wherein the step of transporting the film includes the first and second conveyor assemblies engaging opposing surfaces, respectively, of the film, the first and second pads being brought into sequential contact with the film, and with this sequential contact, the film being periodically in simultaneous contact with both of the first and second pads along a grip line perpendicular to the direction of transport.

* * * * *

UNITED STATES PATENT AND TRADEMARK OFFICE
CERTIFICATE OF CORRECTION

PATENT NO. : 10,583,603 B2
APPLICATION NO. : 15/538775
DATED : March 10, 2020
INVENTOR(S) : Jeff Jackson Page 1 of 1

It is certified that error appears in the above-identified patent and that said Letters Patent is hereby corrected as shown below:

In the Specification

Column 7
Line 24, Delete "160°) to 179°." and insert -- 160° to 179°). --, therefor.

Column 11
Line 32, Delete "takeaway" and insert -- take-away --, therefor.

In the Claims

Column 15
Line 5, In Claim 1, after "first" delete "a".

Signed and Sealed this
Twenty-seventh Day of October, 2020

Andrei Iancu
*Director of the United States Patent and Trademark Office*